United States Patent [19]

McLoughlin

[11] 4,016,356
[45] Apr. 5, 1977

[54] HEAT RECOVERABLE ARTICLE

[75] Inventor: Robert H. McLoughlin, Swindon, England

[73] Assignee: Raychem Limited, London, England

[22] Filed: Feb. 2, 1976

[21] Appl. No.: 654,272

Related U.S. Application Data

[63] Continuation-in-part of Ser. No. 504,375, Sept. 9, 1974, Pat. No. 3,946,143.

[30] Foreign Application Priority Data

Sept. 10, 1973 United Kingdom ............ 42483/73

[52] U.S. Cl. ............................ 174/35 R; 138/139; 285/381; 285/DIG. 10; 174/84 R; 174/DIG. 8
[51] Int. Cl.² .................................. H02G 15/08
[58] Field of Search .......... 138/119, 137, 139, 140, 138/173, 178; 156/86; 264/230; 285/381, DIG. 10; 174/84 R, 35 R, DIG. 8

[56] References Cited

UNITED STATES PATENTS

| | | |
|---|---|---|
| 3,253,618 | 5/1966 | Cook ...................... 174/DIG. 8 X |
| 3,297,819 | 1/1967 | Wetmore ...................... 138/137 X |
| 3,582,457 | 6/1971 | Barthell ............................ 138/140 |
| 3,950,604 | 4/1976 | Penneck ........................ 138/137 X |

FOREIGN PATENTS OR APPLICATIONS 1,259,774  1/1972  United Kingdom .......... 174/DIG. 8

Primary Examiner—Charles E. Phillips
Attorney, Agent, or Firm—Lyon & Lyon

[57] ABSTRACT

A heat recoverable article for shielding junctions in cables or conduits comprising a corrugated sheath in part capable of radial deformation disposed within a member of heat-recoverable material part of the sheath having transverse corrugations that resist deformation. A sheath made of conductive material may function to protect the junction from radio frequency interference. The ends of the member may be provided with adhesive to render the junction impermeable to water, gases, etc.

9 Claims, 2 Drawing Figures

HEAT RECOVERABLE ARTICLE

This application is a continuation-in-part of my co-pending application Ser No. 504,375, filed September 9, 1974, now U.S. Pat. No. 3,946,143.

BACKGROUND OF THE INVENTION

The present invention relates to a recoverable, especially to a heat-recoverable, article and a method for protecting or shielding a junction or discontinuity in cables or conduits for example coaxial cables and other cables having a conductive outer shield from external radio frequency interference.

Heat recoverability is characterized by the ability to undergo a permanent change in dimensions with the application of heat. In general, the property of heat recoverability can be imparted to a material having a plastic or elastic memory by deforming the material at an elevated temperature to a size different from its normal size and then cooling while maintaining the material in the deformed size.

The prior art methods of shielding cables from external radio frequency interference have been plagued by the problem of leakage. The problem is particularly acute at a junction between two or more such cables where it is important that the continuity of the outer conductive shield be maintaned in both longitudinal and circumferential directions in order to provide adequate screening against stray radiation.

The use of heat-recoverable tubing in connection with the shielding and protecting of cable junctions and the like is known. Also, the use of a heat-shrinkable tubing "sandwiched" with conductive braid is known as described in U.S. Pat. No. 3,253,619, the disclosure of which is incorporated herein by reference. Although braided shields have been used to protect coaxial cables from radio frequency interference I have perceived that the utility of these shields could be greatly enhanced if the shield could be formed to protect the cable from high frequency radiation which is capable of penetrating the interstices between the strands of a braided shield and shaped so that it is capable of deforming uniformly when the tubing with which it is sandwiched is caused to be recovered.

It is thus an object of the present invention to provide a recoverable, especially a heat-recoverable article for effectively protecting or shielding a junction or discontinuity in conduits or cables from radio frequency interference, water, gas, solvents etc.

This and other objects are accomplished by shielding or protecting a junction or discontinuity in conduit or cable with an article comprised of a member of heat-recoverable material having a corrugated sheath disposed therein.

In my co-pending U.S. Ser. No. 504,375 (British patent application No. 42483/73), the disclosure of which is incorporated by reference herein. I provide an assembly for such purposes which comprises a hollow shrinkable component and a longitudinally corrugated sheath of external diameter such that is may be inserted into the shrinkable component (i.e., while the latter is in an expanded state) and of internal diameter such that it may be positioned over the substrate to be protected. Advantageously the hollow shrinkable component is a sleeve, and is heat-shrinkable, and the sheath is disposed internally in and coaxially with the sleeve.

The corrugations are preferably substantially parallel to the axis of the sheath but may be inclined thereto, e.g., up to about 45°.

The present invention provides an assembly which comprises a hollow shrinkable component and a corrugated sheath, of external cross-section such that it may be inserted into the shrinkable component, the sheath having longitudinal corrugations extending over substantially the whole of its length and transverse corrugations extending over a part, preferably the central region, only of its length.

The longitudinal corrugations are preferably parallel to the axis of the sheath and, where the shrinkable component is a sleeve, the sheath and sleeve preferably being coaxial, to the axis of the shrinkable component, but they may be inclined at up to about 45° thereto. The transverse corrugations are preferably perpendicular to the axis of the sheath, and preferably perpendicular to the longitudinal corrugations, but they may be inclined to the axis at an angle of at least 45°, preferably being at right angles to the longitudinal corrugations.

The longitudinal corrugations preferably extend from a first end to a second end of the sheath and regions containing only such corrugations are collapsible inwardly upon the imposition of the radially inward force of recovery, especially heat-recovery, to reduce the mean cross-section, e.g. the diameter, of the sheath.

A region which also contains transverse corrugations is by contrast sufficiently rigid to withstand the inward force of recovery of the shrinkable component so that recovery in that region or those regions is inhibited.

By appropriate choice of region(s) having both types of corrugations and region(s) having longitudinal corrugations, the shrinkage of the shrinkable component may be controlled as desired for any particular end-use.

A more thorough disclosure of the objects and advantages of the invention is presented in the detailed description which follows and in the accompanying drawings in which.

DETAILED DESCRIPTION OF THE INVENTION

Figure 1:
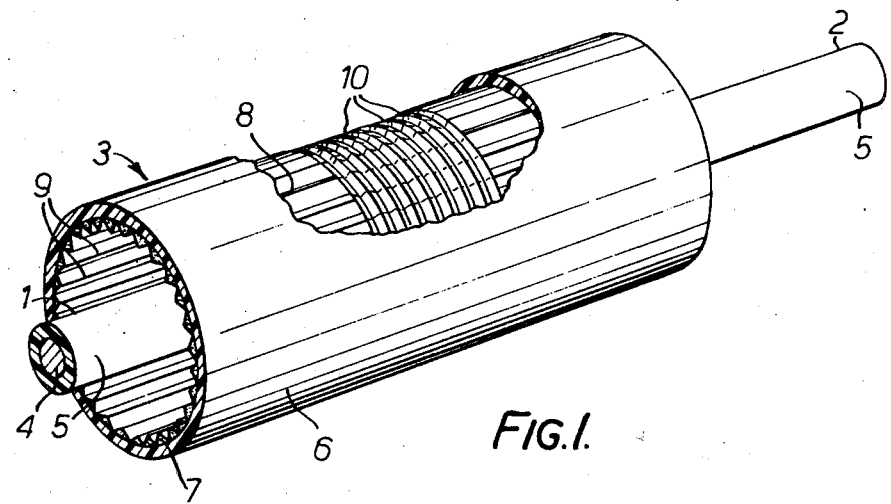
FIG. 1 is a perspective view partly broken away, showing a heat-recoverable article positioned over a junction of a cable with the heat-recoverable member in an expanded state.

The heat-recoverable article of the present invention finds particular application in the protection of junctions in coaxial and other types of electric cables having a conductive outer shield. However, the article is also very useful for rendering conduit junctions waterproof or impervious to gases, solvents etc. The heat-shrinkable member may be made of any suitable material, for example those described in U.S. Pat. Nos. 3,086,242 and 3,243,211 the disclosures of which are incorporated herein by reference. The modulus and/or the recovery stress of the member should be sufficient to crush and deform the corrugated sheath where desired.

Polyolefines, especially polyethylene, and polyvinylidene fluoride may be used. The polymers may be cross-linked by chemical means or by irradiation and may also contain the conventional additives (fillers, flame retardants, anti-oxidants etc.).

The heat-shrinkable member is preferably formed as a sleeve, but can be formed as a boot or breakout.

When the heat-recoverable member is a boot it is formed as a substantially straight tube but upon recovery the tube becomes bent. The heat-shrinkable member can also be used to compress only part of a sheath disposed only partially therein. In the case where the heat recoverable article is used as a barrier against moisture, gases or solvents, the ends of the heat recoverable sleeve preferably extend beyond the ends of the sheath. The ends of the sleeve are then coateld entirely or in part on the inside with sealant, for example mastic or a hot-melt adhesive, such that, when the sleeve is shrunk down, the ends are sealed to the conduits to form a waterproof bond.

The heat-recoverable sleeve is provided with a sheath which is disposed therein and positioned so that the sheath is coaxial and proximate to the sleeve. The sheath is provided with a plurality of corrugations which are formed from one end of the sheath to the other end. These corrugated regions are capable of collapsing inwardly when the sleeve is recovered by the addition of heat. During the recovery process, the sleeve imposes a radially inwardly directed force on the sheath resulting in a decrease in the mean diameter of the sheath. The mean diameter of the sheath is defined by points located midway between the radial extremes of the corrugations. The corrugations enable the sheath to be pushed into a deformed shape when the surrounding sleeve is recovered. The corrugations are preferably disposed in a longitudinal array parallel to the axis of the sheath but may also be for example, zigzag or in the form of a sine curve. If the sheath has regular zigzag corrugations, the angle between the phases is preferably from 70° to 120°. A copper sheath may have, for example folds at intervals of about 0.3 cm. with an angle between the phase of approximately 110°. At a desired region or regions, the sheath has transverse corrugations, as well as having longitudinal corrugations along its whole length. With more complex shrinkable parts, it may be necessary to use more than one appropriately shaped sheath, each with suitable corrugations.

Preferably the sheath completely surrounds the junction. The sheath may be a continuous seamless tube, or it may be made from sheet capable of being wrapped around the junction provided there is sufficient overlap to ensure continuity. However, any seam in the sheath formed from a sheet should be rendered waterproof, for example, by welding or soldering, if the purpose of the sheath is to prevent moisture ingress.

When the article is to be used to provide radio frequency interference shielding, the sheath is made of a conductive material. Metal foil is particularly suitable because of its ductility and any soft metal having good electrical and thermal properties may be used, such as copper, aluminium, gold, tin, silver, or platinum. The foil may be pre-tinned to facilitate soldering.

Metal foil may also be used in applications where electrical conductivity is not required, for example, when the article is primarily used as a barrier against water vapor. For vapor barrier applications aluminium foil is especially suitable. However, any material possessing suitable properties of deformability and impermeability to water, gases, solvents, etc., as required, may also be used.

When the sheath comprises metal foil, the thickness is preferably within the range of from 0.001 to 0.015 cm., preferably from 0.0025 to 0.005 cm. Thinner foils tend to tear in use and are also somewhat difficult to obtain. Metal foils thicker than 0.015 cm. are difficult to corrugate and tend to deform non-uniformly. The preferred thickness of a particular application depends on various factors, for example the amount of recovery required, the shape of the joint after recovery, the metal used, the size of the joint, the shape of the sheath and the modulus of the heat-shrinkable sleeve.

The corrugated sheath may have disposed within it at any region in which it is to collapse an inner heat-shrinkable sleeve, such that the sheath is sandwiched between two heat-shrinkable sleeves. The inner sleeve is positioned so that it is coaxial with and proximate to the sheath. The inner sleeve provides protection to the conduits form the collapsing sheath during the recovery process. For example, the inner sleeve may prevent injury to the foam dielectric in a coaxial cable from the sharp edges of a metal-foil sheath as it is compressed by the shrinkage of the outer sleeve.

When the article is used for a junction in an electric cable having an outer shield, the corrugated sheath is of such a length that when the article is in position it forms a complete continuous conductive shield around the junction. Preferably, means are incorporated for ensuring a good and permanent electrical contact between the sheath and the outer shield of the or each cable, for example, solder rings, preferably pre-fluxed solder rings may be placed under or adjacent to the ends of the sheath such that, during shrinkdown, soldering occurs between the metal of the sheath and the outer shield of the cables.

Referring now to the drawings, two shielded cables 1, 2 to be joined are positioned within a heat-recoverable member indicated generally by the reference numeral 3. It will be appreciated that the numerous individual conductors 4 of each cable have to be joined and insulated, for example by the use of heat-recoverable sleeves containing metered amounts of solder, and that to achieve this, the outer jackets 5 of the cables 1, 2 are stripped and the conductors "fanned out." The cable splice is then necessarily greater in cross-section than the cables, and the individual conductors more vulnerable at their junctions. To allow for this, and to give protection, the member 3 comprises a heat shrinkable sleeve 6 having positioned within it, and if desired adhered thereto by a layer of sealant 7, a corrugated annular metal foil sheath 8 having longitudinal corrugations 9 throughout its length and perpendicular circumferential corrugations 10 in its central region only.

The corrugations are preferably imparted to the foil by passing it between a pair of nip rollers havinginterengaging teeth cut parallel to their axes, to form primary corrugations, and then passing the sheet through similar rollers of appropriate length to form the secondary corrugations in the desired region of the sheet only, the sheet having been turned through 90° between the two passes. The secondary corrugations deform the lines of the primary to give a double kink at the coincidences of the apcies.

Depending on the nature of the foil it may be desirable that the secondary corrugations be longitudinal, since the foil may more readily be rolled to form a tube having an axis parallel to these deformations than to the primary deformation, whilst the secondary corrugations may be transverse when considerations of strength of the final product are paramount. Those skilled in the art will appreciate that the directional the secondary corrugations will depend on the use to which the article is to be put.

Figure 2:
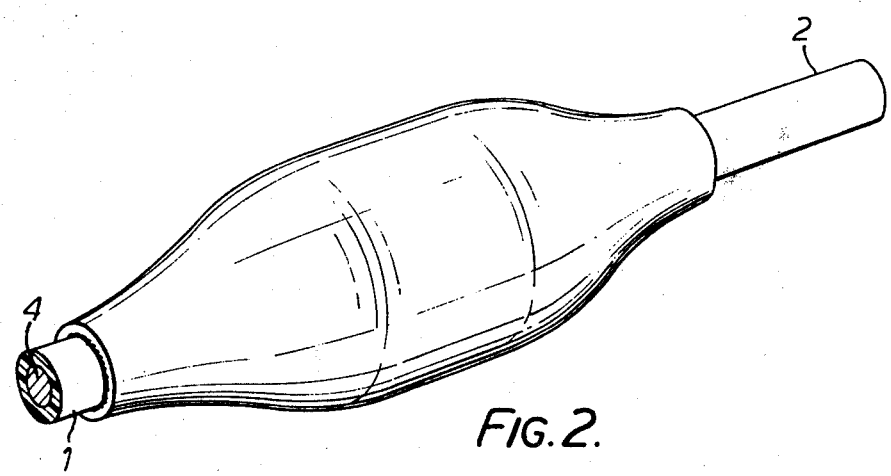
FIG. 2 is a view of the junction with the member in a recovered state.

Referring now to FIG. 2, there is shown the member 3 after heat-recovery about the splice between the cables 1, 2 It will be seen that the central region, occupied by the circumferential corrugations 10, has remained substantially at the original diameter, while the ends have recovered to the extent allowed by the cable, the sealant 7 serving to assist in sealing the ends against moisture ingress. Between the central region and the ends, the extent of recovery varies smoothly to give a protected cable splice free from vulnerable edges, the longitduinal corrugations being deformed radially to a gradually varying extent, depending on the distance from the rigid doubly corrugated control region.

I claim:

1. A heat recoverable article comprising a first hollow member composed of heat-recoverable material and an annular corrugated sheath disposed therein, the sheath having longitudinal corrugations extending over substantially the whole of its length and transverse corrugations extending over only a part of its length and being transverse to said longitudinal corrugations, the region having only longitudinal corrugations being collapsible upon the imposition of radially inward recovery force of the member.

2. An article as claimed in claim 1, wherein the transverse corrugations extend over only the central region of the length of the sheath.

3. An article as claimed in claim 2, wherein the transverse corrugations are circumferential being perpendicular to the longitudinal axis of the sheath.

4. An article as claimed in claim 3, wherein the longitudinal corrugations are parallel to longitudinal axis of the sheath.

5. An article as claimed in claim 1, wherein the sheath is electrically conductive.

6. An article as claimed in claim 1, wherein the sheath is of aluminium foil.

7. An article as claimed in claim 1, which also comprises a layer of sealant disposed between the member and the sheath.

8. An article as claimed in claim 1, wherein the sheath is substantially impermeable to water vapor, whereby corrosion protection is also provided.

9. An article as claimed in claim 1, wherein the sheath is electrically conductive, whereby electromagnetic shielding is also provided.

* * * * *